W. L. BLISS.
MEANS FOR CIRCULATING ELECTROLYTE.
APPLICATION FILED MAY 26, 1912.

1,160,133.

Patented Nov. 16, 1915.

Witnesses:

Inventor
William L. Bliss

UNITED STATES PATENT OFFICE.

WILLIAM L. BLISS, OF NIAGARA FALLS, NEW YORK, ASSIGNOR, BY MESNE ASSIGNMENTS, TO U. S. LIGHT AND HEAT CORPORATION, OF NIAGARA FALLS, NEW YORK, A CORPORATION OF NEW YORK.

MEANS FOR CIRCULATING ELECTROLYTE.

1,160,133.  Specification of Letters Patent.  Patented Nov. 16, 1915.

Application filed March 26, 1912. Serial No. 686,329.

*To all whom it may concern:*

Be it known that I, WILLIAM L. BLISS, a citizen of the United States, residing at Niagara Falls, in the county of Niagara and State of New York, have invented new and useful Improvements in Means for Circulating Electrolyte, of which the following is a full, clear, concise, and exact description, reference being had to the accompanying drawing, forming a part of this specification.

My invention relates to a method of circulating the electrolyte in storage batteries, and it also relates to means for causing said circulation.

In certain plants, storage batteries are employed under certain conditions, which are especially designed to discharge at high rates to carry the working load in certain emergencies. Such batteries are known as "stand-by" batteries. With the electrolyte in a state of quiescence a battery of this type cannot give up its energy on discharge for as long a continued period as would be the case if the electrolyte is agitatetd in some manner. This is due to the fact that upon discharge the sulfuric acid radical, $SO_3$, is abstracted from the electrolyte and combines with the material of the plates to form lead sulfate, $PbSO_4$. This reduces the density of the electrolyte, and, in fact, a heavy discharge leaves water adjacent to the elements. This, not only increases the internal resistance, but prevents the chemical action required to produce E. M. F. within the battery required to circulate the discharging currents of large value for a sustained period.

It is an object of my invention to effect the circulation of the electrolyte in such a manner as to overcome the above difficulties.

In the accompanying drawings I have illustrated suitable mechanism for accomplishing this end. It is apparent that the invention may be embodied in other forms.

Figure 1:
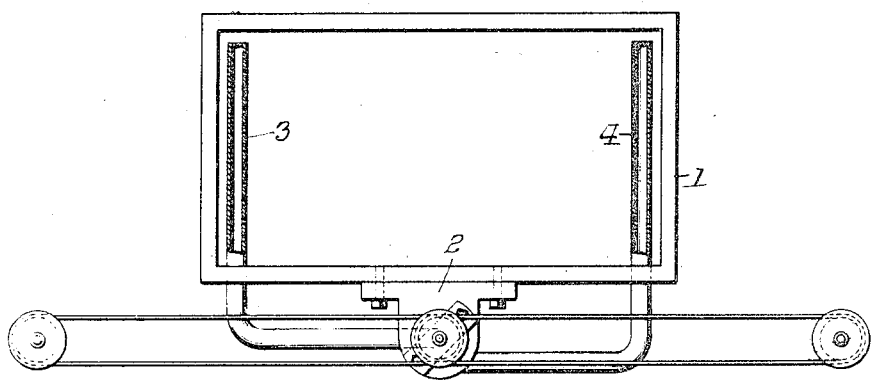
Figure 2:
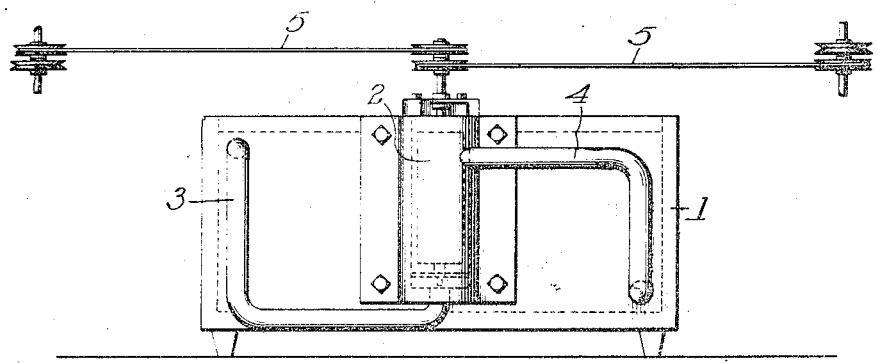

In the drawings: Figure 1 is a top plan view of a battery cell equipped with a circulating device embodying the invention. Fig. 2 is an elevation of the device shown in Fig. 1.

The battery cell, or casing 1, may be of any suitable form. For the sake of clearness, the battery plates are omitted from the drawings. At the side of each cell, a small rotary circulating pump 2 is preferably provided outside of the same, which may be of any suitable type, adapted, when in operation to draw in the electrolyte through an opening in the bottom thereof preferably located centrally and adapted to throw out the electrolyte tangentially from an opening near the top. The inlet pipe 3 is adapted to draw off the electrolyte near the surface thereof while the discharge pipe 4 is adapted to return the electrolyte near the bottom of the cell, and preferably at the opposite end from the inlet pipe, whereby ample space for the battery plates are provided between said pipes. Both pipes 3 and 4 are provided with suitable perforations.

The rotary pump is driven preferably by a small belt 5 from any suitable source of power. Where a plurality of cells are employed, the arrangement is preferably such that all the pumps may be driven from a single source of power in the manner suggested in Fig. 2. The pumps are constructed preferably of acid resisting material, and while preferably bolted to the cells, they may be mounted in some independent manner. The rotary pump in operation draws in the electrolyte from one end of the cell, and throws it off tangentially through the discharge pipe which again delivers it to the cell at the other end. In this manner a thorough circulation of the electrolyte is insured.

I do not limit myself to the specific embodiments described, but desire, of course, to include such other embodiments as fall within the scope of the appended claim.

I claim as my invention.

Means for increasing the efficiency of a storage battery installation comprising a plurality of battery cells, said means including means for simultaneously causing the circulation of the electrolyte in all of said cells, said last mentioned means comprising an outlet pipe for each cell provided with a perforated horizontal section extending through a wall of said cell slightly below the normal level of the electrolyte in each cell, an inlet pipe for each cell provided with a perforated horizontal section extending through a wall of said cell adjacent the bottom thereof, the perforations in said sections being arranged to direct jets therefrom substantially horizontal with the bottoms of the receptacles, a rotating lift pump for each cell, connections from the outlet pipe of each cell to the receiving end of the corresponding pump, connections from the inlet pipe of each cell to the discharge end of the corresponding pump, and mechanical connections between the driving members of the various pumps whereby the pumps for said cells may be simultaneously operated.

In witness whereof, I have hereunto subscribed my name in the presence of two witnesses.

WILLIAM L. BLISS.

Witnesses:
C. C. CARPENTER,
L. A. PETTEBONE.